Figure 1:
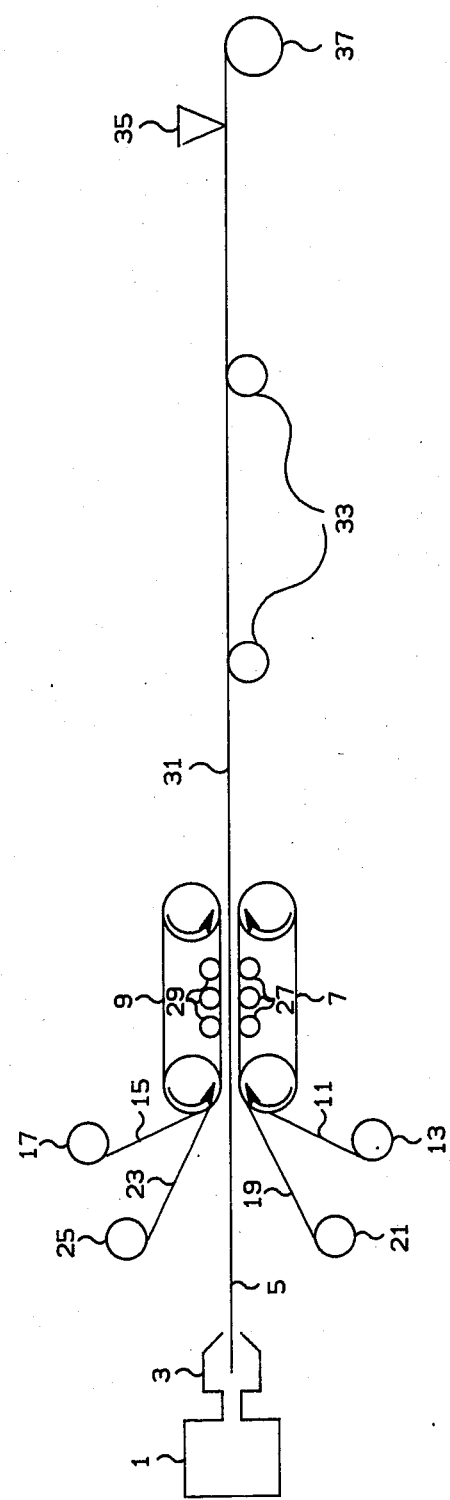

United States Patent [19]

Ma

[11] Patent Number: 4,622,192

[45] Date of Patent: Nov. 11, 1986

[54] STAMPABLE SHEETS OF GLASS/CARBON FIBER MAT REINFORCED POLYMERS OF OLEFIN AND METHOD OF PREPARATION

[75] Inventor: Chen-Chi M. Ma, Bartlesville, Okla.

[73] Assignee: Phillips Petroleum Company, Bartlesville, Okla.

[21] Appl. No.: 569,624

[22] Filed: Jan. 10, 1984

[51] Int. Cl.$^4$ .................. B29C 24/00; B32B 1/02; B32B 17/04; H05K 9/00
[52] U.S. Cl. .................. 264/136; 156/224; 156/244.11; 156/244.12; 156/244.22; 156/244.24; 156/244.27; 156/324; 174/35 GC; 174/35 MS; 264/257; 264/248; 264/257; 264/258; 264/324; 264/331.11; 336/84 C; 427/389.8; 428/285; 428/286; 428/288; 428/290; 428/298; 428/302; 428/408; 428/922
[58] Field of Search ............ 156/224, 244.11, 244.12, 156/244.22, 244.24, 244.27, 324; 174/35 GS, 35 MS; 252/510, 511; 264/136, 248, 258, 257, 324, 331.7; 336/84 C; 427/389.8; 428/285, 286, 288, 290, 298, 302, 408, 922

[56] References Cited

U.S. PATENT DOCUMENTS

| | | | |
|---|---|---|---|
| 4,227,037 | 10/1980 | Layton | 174/35 MS |
| 4,238,266 | 12/1980 | Steinberg et al. | 156/243 |
| 4,243,460 | 1/1981 | Nagler | 174/35 MS |
| 4,269,884 | 5/1981 | DellaVecchia et al. | 428/131 |
| 4,302,269 | 11/1981 | Steinberg | 156/244.12 |
| 4,356,228 | 10/1982 | Kobayashi et al. | 428/408 |
| 4,471,015 | 9/1984 | Ebneth et al. | 252/511 |

OTHER PUBLICATIONS

Warfel, 35th Annual Technical Conference, 1980, Reinforced Plastics/Composites Institute, The Society of the Plastics Industry, Inc., Sec. 19E, pp. 1–6.
Bigg, *Composites*, Apr. 1979, pp. 95–100.
Davenport, *Plastics Engineering*, Dec. 1978, pp. 43–46.
Fowler et al., *Plastics Engineering*, Jun. 1981, pp. 29–30.

Primary Examiner—James C. Cannon
Attorney, Agent, or Firm—A. W. Umphlett

[57] ABSTRACT

A method for preparing stampable composites of polymer of olefin and fiber mat composites which are a mixture of glass fiber and carbon fiber by surrounding a fiber mat of a mixture of glass fiber and carbon fiber with a matrix of polymer of olefin. A stampable composite of polymer of olefin and fiber mat produced by such a method.

4 Claims, 4 Drawing Figures

STAMPABLE SHEETS OF GLASS/CARBON FIBER MAT REINFORCED POLYMERS OF OLEFIN AND METHOD OF PREPARATION

BACKGROUND OF THE INVENTION

This invention relates to polymers of olefin compositions, most particularly to polyethylene compositions. In one of its aspects this invention relates to reinforced compositions containing glass/carbon fiber mat reinforcement. In another of its aspects this invention relates to reinforced compositions containing polymers of olefin. In still another of its aspects this invention relates to stampable composites containing glass/carbon fiber mat reinforcement. In yet another of its aspects this invention relates to stampable, reinforced composites containing polymers of olefin. In other aspects of the invention, it relates to methods for producing reinforced composites and the producing of stamped objects from these composites.

Polymers of olefin are known to be useful in the production of stampable composites that can be reinforced using fibrous materials. The use of both glass fibers and carbon fibers as reinforcing agents for polymers of olefin compositions is also known in the art. This invention is based on the discovery that a combination of glass fiber and carbon fiber used together as reinforcing agent provides physical characteristics for the reinforced composition that are superior to either polymers of olefin reinforced with glass fiber or polymers of olefin reinforced with carbon fiber used alone. This enhancement of physical characteristics is particularly evident within certain range limitations in the ratio of glass to carbon in the reinforcing fiber mixture.

It is therefore an object of this invention to provide a method for producing stampable sheets of polymers of olefin reinforced with fibrous mat. It is another object of this invention to provide a method for producing stamped objects from polymers of olefin reinforced with fibrous mat. It is still another object of this invention to provide a method for producing stampable sheets in which polymers of olefin are reinforced with glass/carbon fibrous mat. It is still another object of this invention to provide a method for producing stamped objects from polymers of olefin reinforced with glass/carbon fibrous mat. It is still another object of this invention to provide a stampable composite of polymer of olefin reinforced with glass/carbon fibrous mat.

Other aspects, objects and various advantages of this invention will become apparent from reading the specification and the appended claims.

STATEMENT OF THE INVENTION

According to this invention, a method is provided for preparing stampable composites of polymer of olefin and composite fiber mat having both carbon and glass fibers. In this method a fiber mat which is a mixture of carbon and glass is surrounded with a matrix of polymer of olefin.

In a more particular embodiment of the method of this invention the fiber mat is surrounded with the matrix of polymer of olefin by contacting at least one sheet of polymer of olefin with at least one side of the fiber mat while applying sufficient heat and pressure to cause the polymer of olefin to flow around the fiber mat.

In another embodiment of the method of this invention the fiber mat is impregnated with a slurry of polymer of olefin in a carrier liquid; the impregnated mat is then dried to remove the carrier liquid thereby producing a dried impregnated mat; and a dried, impregnated mat is subjected to sufficient heat and pressure to cause the polymer of olefin to flow around the fiber mat.

In further embodiments of the invention, at least one, preferably a stack, of stampable polymer of olefin reinforced with fiber mat composites prepared as described above is subjected to heating to a temperature range suitable for stamping and, while the composite remains at stamping temperature, supplying sufficient pressure on the composite material within a stamping press to form an object from the composite material.

In a still further embodiment of the invention, a stampable composite of a fibrous mat composite of glass fiber and carbon fiber within a matrix of polymer of olefin is provided.

The polymer of olefin useful in the present invention is prepared by any known method of polymerization of α-olefin monomers having 2–6 carbon atoms per molecule. Monomers useful in the invention can be ethylene, propylene, butene, pentene, and hexene, or copolymers thereof. Particularly useful in the present invention are polymers of ethylene and propylene, most preferably high density polyethylene having a density of about 0.95–0.98 g/cc.

The reinforcing material useful in the present invention is made up of a mixture of glass and carbon fiber. The reinforcing agent is preferably in the form of a mat. The fibers can be continuous or they may be cut or chopped. If continuous fibers are not used the length of the fibers will usually fall within the range of about 0.125 inch to about 10 inches, preferably within a range of about 0.5 inch to about 2 inches. Fiber mat made from continuous fiber can contain a binding material and fiber mat that does not have continuous fibers usually will have a binder material particularly for the shorter fiber lengths. Binders usually are chosen from thermoplastic materials and thermoset plastics.

It is also within the scope of this invention to include metalized, conductive fiber mat material as the reinforcing agent. Commercially available metalized glass mat or metalized carbon mat having a sufficient amount of metal to provide electrical conductivity can be used in end products where shielding from electromagnetic induction, especially radio frequency induction will provide an advantage.

Using mixtures of carbon and glass fibers it will be shown below in the examples that varying the ratio of carbon to glass fibers produces mats that are all usable. It has been found, however, that better physical properties for the compositions are obtained when the glass fiber to carbon fiber ratio ranges from about 30 weight percent glass: 70 weight percent carbon to 70 weight percent glass: 30 weight percent carbon, preferably from about 40 weight percent glass: 60 weight percent carbon to 60 weight percent glass: 40 weight percent carbon. The ratio of polymer of olefin matrix to fiber reinforcement is in a range of about 90 weight percent polymer of olefin: 10 weight percent fiber mat to about 10 weight percent polymer of olefin: 90 weight percent fiber mat, preferably about 80 weight percent polymer of olefin: 20 weight percent fiber mat to about 20 weight percent polymer of olefin: 80 weight percent fiber mat and most preferably from about 70 weight percent polymer of olefin: 30 weight percent fiber mat to about 30 weight percent polymer or olefin: 70 weight percent fiber mat.

The method for producing the reinforced, stampable composite of polymer of olefin and fiber mat according to this invention encompasses any method by which the fiber mat material can be surrounded with a matrix of polymer of olefin.

Figure 2:
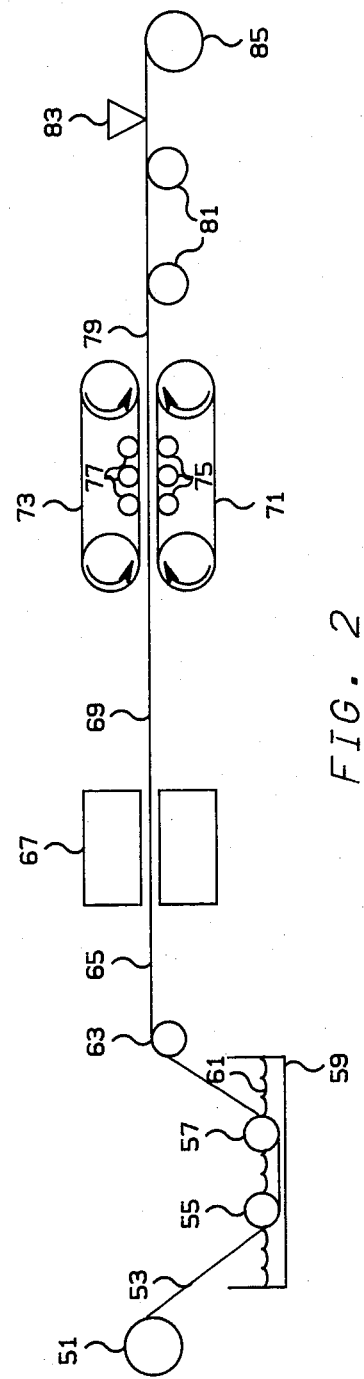
Figure 3:
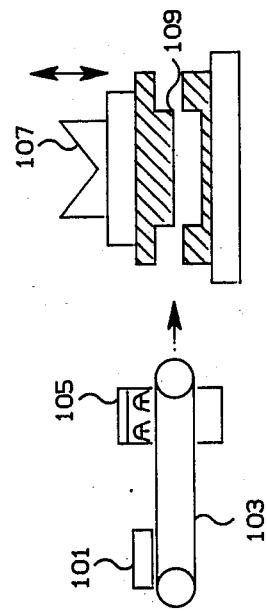

Two of the preferred embodiments for producing the stampable, reinforced composite will be outlined below, described in conjunction with the drawing in which FIG. 1 is a schematic representation of a continuous process for laminating polymer of olefin sheets with fiber mat, FIG. 2 is a schematic representation of a continuous process for impregnating fiber mat with polymer of olefin to produce the composite, and FIG. 3 is a schematic representation of a semi-continuous process for stamping objects from stampable, reinforced composites. FIG. 1 is a continuous process similar to the unitary process shown in example 1. FIG. 2 is a continuous process similar to the unitary process set out in example 3. The stamping operation of FIG. 3 is similar to that set out in example 1.

Referring now to the drawing. In FIG. 1, a method for preparing reinforced, stampable polymer of olefin/fiber mat composites can be described. An extruder (1) passes molten polymer of olefin through a die head (3) to produce a sheet of polymer of olefin (5) which passes between the heated steel belts (7), (9). Also passed between the heated steel belts are polymer of olefin sheets (11), (15) are mats of fibrous material (19) unrolled from rolls (21) and (23) unrolled from roll (25). These sheets of material from the strata of a laminate passing between heated steel belts (7), (9) and compressed by pressure rolls (27), (29) at a temperature and pressure sufficient to flow the polymer of olefin around the fiber mat producing a unitary sheet of fibrous reinforcing material surrounded in a matrix of polymer of olefin (31). This sheet cools as it is forwarded on support rolls (33) either to a cutting device (35) to produce sheets of predetermined length or onto a wind-up roll (37).

Obviously, the extruder (1) and either of the sheets of fiber mat reinforcement (19), (23) could be omitted so that all of the matrix and reinforcement material is supplied from prepared rolls of material or extruded material could be substituted for the rolled up polymer of olefin sheets (13), (17). The illustrated method of preparation provides basis for a number of variations of type of feedstock for this process.

Referring now to FIG. 2, a roll a fiber mat (51) unrolls to provide a sheet of fiber mat (53) which passes under redirecting bars (55), (57) to be directed through a slurry bath (59) of polymer of olefin and aqueous solution at a speed so that sufficient polymer of olefin is taken up into the fiber mat to provide the required coating of the fiber. After passing through the slurry (61) and over redirect bar (63) the fiber mat containing slurry (65) is passed through heater (67) where it is heated sufficiently to remove the carrier liquid and can be heated sufficiently to make the polymer tacky. The dried slurry coated fiber mat (69) then passes between steel belts (71), (73) and is pressed by pressure rolls (75), (77) to provide sufficient heat and pressure to flow the polymer around the fiber mat reinforcement to produce a fiber mat in a matrix of polymer of olefin (79). This composite (79) cools as it is passed over support roll (81) either to a cutting device (83) or to a wind-up roll (85).

Referring now to FIG. 3, sheets of composite (101), either singly or stacked as strata to form a laminate, are passed by belt (103) through a heater (105) in which the temperature is raised sufficiently for the composite to be molded by stamping. The heated composite, or stacked composites, are then passed into a stamp press (107) which can be a hand press or preferably a hydraulic press, when sufficient pressure is applied while the composite is still at stamping temperature to mold sheet into the shape of press die (109). After being held in the die for sufficient time to obtain molded shape the molded object can be removed.

The materials used as feed for the extruder or as feed rolls or slurry in the processes just described are readily obtained in commerce as will be shown in the examples that follow. These examples should be taken as illustrative and not as being exclusive.

EXAMPLE I

In this example the preparation of stampable composites of high density polyethylene (PE) and glass-carbon hybrid fiber mats is described. Dry HDPE pellets having a density of 0.9598 g/cc were extruded into sheets by means of NRM extruder through a slot die having a width of 8 inches and a height of about 10 mils (0.01 inch), at a temperature of about 20° C.

The glass fiber mat material employed was supplied by International Paper Company. 77 West 45th Street, New Yor, N.Y.) and had a mat weight of about 1.0 ounce per yard$^2$ and a fiber length of about 1 inch. The carbon fiber mat employed was also obtained from International Paper Co. and had the same mat weight per ounce and fiber length as the glass fiber mat.

Several PE sheets of 10 inch thickness (total weight of PE sheets: 175 grams) and several layers of fiber mat (total weight of fiber mats: 75 grams) were plied up in a 10"×10"×0.127" "picture frame" mold. A typical plying pattern was: 3 PE sheets, 1 fiber mat, 3 PE sheets, 1 fiber mat, 3 PE sheets. When mixed (hybrid) glass-carbon fiber mats were employed, the two single mats were manually partially separated into thinner mat layers and then mixed at the desired ratio. e.g., for run 2, 56.2 grams of glass fiber mat and 18.8 grams of carbon fiber mat were manually mixed and plied with PE sheets as described earlier.

The plied up PE sheets and fiber mats were heated for about 2 minutes to about 450° F. in a hydraulic press (supplied by Pasadena Hydraulic Industries) under a force of about 5 tons (pressure: 100 psig). Then the force was raised to 15 tons (pressure: 300 psig) and the materials were heated at 450° F. for 3 minutes. Finally the laminated composite sheet was allowed to cool to room temperature under a force of 15 tons.

EXAMPLE II

Measured physical properties of composites, laminated in accordance with the procedure described in Example, are summarized in Table I. All composite samples had a PE content of about 70 weight percent and a fiber mat content of about 30 weight percent.

TABLE I

| Run | 1 | 2 | 3 | 4 | 5 |
|---|---|---|---|---|---|
| Wt % Glass in Mat | 100 | 75 | 50 | 25 | 0 |
| Wt % Carbon in Mat | 0 | 25 | 50 | 75 | 100 |
| Flexural Modulus,[1] MPa | 2,762 | 3,728 | 6,006 | 6,221 | 6,280 |
| Flexural Strength,[1] MPa | 77.7 | 82.0 | 105 | 106 | 111 |
| Tensile at Break,[2] MPa | 51.1 | 61.5 | 82.5 | 91.7 | 104 |
| Shore D Hardness[3] | 68 | 72 | 73 | 73 | 71 |
| Notched Izod Impact,[4] J/m | 448 | 447 | 442 | 366 | 331 |

TABLE I-continued

| Run | 1 | 2 | 3 | 4 | 5 |
|---|---|---|---|---|---|
| Unnotched Izod Impact,[4] J/m | 757 | 736 | 630 | 510 | 453 |
| Heat Distortion Temp[5] | 129 | 131 | 132 | 133 | 136 |
| Specific Gravity | 1.17 | 1.14 | 1.13 | 1.11 | 1.09 |

[1]determined according to ASTM D790
[2]determined according to ASTM D638
[3]determined according to ASTM D2583
[4]determined according to ASTM D256
[5]determined according to ASTM D648

Data in Table I indicate that the dependence of several important physical properties on the glass-carbon fiber ratio was not linear as would be expected. In order to illustrate this non-linear behavior, flexural modulus and strength and the two Izod impact parameters are plotted in FIG. 1.

Figure 4:
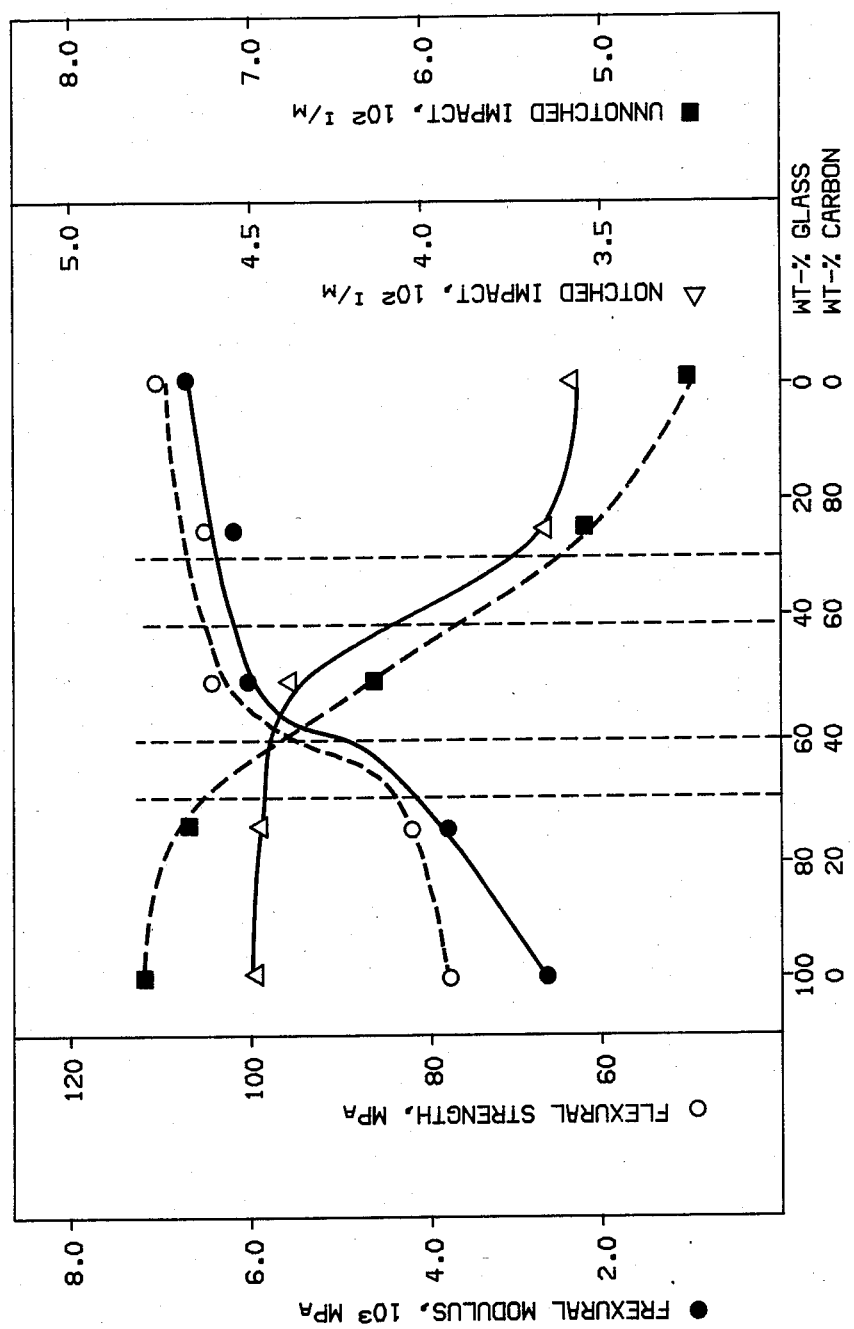

FIG. 4 shows that in the range of 70 percent glass/30 percent carbon to 30 percent glass/70 percent carbon, and especially in the range of 60 percent glass/40 percent carbon to 40 percent glass/60 percent carbon, flexural modulus, flexural strength and impact curves unexpectedly change their slopes and exhibit inflection points. In the broad 70/30-30/70 range, a desirable combination of high flexural modulus (about $4-6\times10^3$ MPa), high flexural strength (about 85–100 MPa), high notched Izod impact (about 390–450 J/m) and high unnotched Izod impact about 520–720 J/m) was attained. In the narrower 40/60-60/40 range, an even better combination of physical properties was achieved.

EXAMPLE III

In this example the preparation and properties of composites with a PE content of about 80 weight percent and a fiber mat content of about 20 weight percent is described. The glass and carbon fiber mats employed were those described in Example I. A hybrid fiber mat of 50 weight percent carbon fibers and 50 weight percent glass fibers was also supplied by International Paper Company. The polymer was HDPE 55200 (density: 0.955 g/cc; marketed by Phillips Chemical Company, Bartlesville, Okla). Physical properties of laminated composites prepared essentially in accordance with the procedure of Example I are listed in Table II.

TABLE II

| Run | 6 | 7 | 8 |
|---|---|---|---|
| Wt % Glass in Mat | 100 | 50 | 0 |
| Wt % Carbon in Mat | 0 | 50 | 100 |
| Flexural Modulus, MPa | 1,765 | 4,033 | 5,117 |
| Flexural Strength, MPa | 33.5 | 59.8 | 76.7 |
| Tensile at Break, MPa | 44.3 | 57.3 | 65.2 |
| Shore D Hardness | 70 | 75 | 75 |
| Notched Izod Impact, J/m | 493 | 508 | 178 |
| Unnotched Izod Impact, J/m | 843 | 775 | 456 |
| Heat Distortion Temp., °C. | 112 | 127 | 115 |

Data in Table II indicate that, unexpectedly, notched Izod impact and heat distortion temperature of the hybrid mat composite (run 7) were higher than for either glass or carbon mat composites.

I claim:

1. A method for preparing stampable composites of polymer of olefin and glass/carbon fiber mat comprising surrounding a fiber mat composite comprising mixtures of glass fiber and carbon fiber with a matrix of polymer of olefin having from 2-6 carbon atoms, said mixture of glass fiber and carbon fiber in a ratio of about 30 weight percent glass fibers to about 70 weight percent carbon fibers to about 70 weight percent fibers to about 30 weight percent carbon fibers wherein surrounding said fiber mat with polymer of olefin comprises:
   (1) impregnating said mat with a slurry of polymer of olefin in a carrier liquid,
   (2) drying said impregnated mat to remove carrier liquid thereby producing a dry, impregnated mat, and
   (3) applying sufficient heat and pressure to said dried, impregnated mat to cause said polymer of olefin to flow around said fiber mat.

2. A method of claim 1 wherein surrounding said fiber mat with polymer of olefin comprises:
   (1) impregnating said mat with a slurry of polymer of olefin in a carrier liquid,
   (2) drying said impregnated mat to remove carrier liquid thereby producing a dry, impregnated mat, and
   (3) applying sufficient heat and pressure to said dried, impregnated mat to cause said polymer of olefin to flow around said fiber mat.

3. A method of claim 1 wherein at least one chosen from among the group consisting of said glass fibers, said carbon fibers, and both said glass fibers and said carbon fibers are metalized.

4. A method for preparing stamped composites of polymer of olefin and fiber mat composite comprising mixtures of glass fiber and carbon fiber, said method comprising subjecting at least one stampable composite of polymer of olefin and fiber mat composite comprising mixtures of glass fiber and carbon fiber prepared by the method of claim 1 to heating to a temperature range suitable for stamping and, subsequently, while the composite remains at said stamping temperature supplying sufficient pressure on the composite material within a stamping press to form an object from said composite.

* * * * *